United States Patent
Ayoub et al.

(10) Patent No.: US 12,086,259 B2
(45) Date of Patent: *Sep. 10, 2024

(54) SECURE OVER-THE-AIR FIRMWARE UPGRADE

(71) Applicant: THIRDWAYV, INC., Irvine, CA (US)

(72) Inventors: Michael Atef Ayoub, Irvine, CA (US); Nabil Wasily, Foothill Ranch, CA (US)

(73) Assignee: THIRDWAYV, INC., Irvine, CA (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/848,587

(22) Filed: Jun. 24, 2022

(65) Prior Publication Data

US 2022/0318390 A1 Oct. 6, 2022

Related U.S. Application Data

(63) Continuation of application No. 16/186,868, filed on Nov. 12, 2018, now Pat. No. 11,372,977.

(51) Int. Cl.
*G06F 21/57* (2013.01)
*H04L 9/08* (2006.01)
*H04L 9/40* (2022.01)

(52) U.S. Cl.
CPC .......... *G06F 21/572* (2013.01); *H04L 9/0822* (2013.01); *H04L 63/0435* (2013.01)

(58) Field of Classification Search
CPC . G06F 21/572; H04L 63/0435; H04L 9/0822; H04L 9/0894; H04L 9/3247;
(Continued)

(56) References Cited

U.S. PATENT DOCUMENTS

| 7,716,276 B1 | 5/2010 | Ren et al. |
| 9,548,867 B2 | 1/2017 | Clark et al. |

(Continued)

FOREIGN PATENT DOCUMENTS

| CN | 103135991 | 5/2013 |
| WO | WO2012071168 | 5/2012 |

(Continued)

OTHER PUBLICATIONS

N. Nikolov, "Research Firmware Update Over the Air from the Cloud," 2018 IEEE XXVII International Scientific Conference Electronics—ET, Sozopol, Bulgaria, 2018, pp. 1-4 (Year: 2018).*

(Continued)

*Primary Examiner* — Michael R Vaughan
(74) *Attorney, Agent, or Firm* — Snell & Wilmer LLP (57) ABSTRACT

Methods, systems, devices, and apparatuses for securely providing an over-the-air firmware upgrade. The system includes an embedded device configured to receive the firmware upgrade. The system includes a server having a memory configured to store a first key encryption key, the firmware upgrade and a firmware key and having a processor coupled to the memory. The processor is configured to obtain the firmware upgrade, the firmware key and the first key encryption key. The processor is configured to encrypt the firmware upgrade using the firmware key. The processor is configured to encrypt the firmware key with the first key encryption key and transmit the encrypted firmware upgrade and the encrypted firmware key to the embedded device.

12 Claims, 5 Drawing Sheets

(58) Field of Classification Search
CPC ...... H04L 9/3263; H04L 67/34; H04W 12/03; H04W 12/35
See application file for complete search history.

(56) References Cited

U.S. PATENT DOCUMENTS

| | | |
|---|---|---|
| 10,505,736 B1 | 12/2019 | Meixler |
| 10,809,999 B2 | 10/2020 | Adrangi et al. |
| 2005/0021968 A1 | 1/2005 | Zimmer et al. |
| 2005/0223372 A1 | 10/2005 | Borchers |
| 2006/0236325 A1 | 10/2006 | Rao et al. |
| 2010/0008510 A1 | 1/2010 | Zayas |
| 2010/0115576 A1 | 5/2010 | Hale et al. |
| 2011/0173457 A1 | 7/2011 | Reh |
| 2011/0208975 A1 | 8/2011 | Sibert |
| 2012/0011219 A1 | 1/2012 | Zhang et al. |
| 2013/0013907 A1 | 1/2013 | Marino et al. |
| 2014/0108786 A1 | 4/2014 | Kreft |
| 2014/0372624 A1 | 12/2014 | Wang et al. |
| 2015/0121070 A1 | 4/2015 | Lau et al. |
| 2017/0249135 A1 | 8/2017 | Gandhi et al. |
| 2017/0286093 A1 | 10/2017 | Steshenko et al. |
| 2017/0322790 A1 | 11/2017 | Surdu |
| 2018/0212814 A1 | 7/2018 | Gulati |
| 2019/0243631 A1 | 8/2019 | Sharma et al. |
| 2020/0004520 A1 | 1/2020 | Storm et al. |
| 2021/0012008 A1 | 1/2021 | Kim et al. |

FOREIGN PATENT DOCUMENTS

| | | |
|---|---|---|
| WO | WO2018/062761 | 4/2018 |
| WO | WO2020042778 | 3/2020 |

OTHER PUBLICATIONS

A. Kolehmainen, "Secure Firmware Updates for IoT: A Survey," 2018 IEEE International Conference on Internet of Things (iThings) and IEEE Green Computing and Communications and IEEE Cyber, Physical and Social Computing and IEEE Smart Data, Halifax, NS, Canada, 2018, pp. 112-117 (Year: 2018).*

B. -C. Choi, S. -H. Lee, J. -C. Na and J. -H. Lee, "Secure firmware validation and update for consumer devices in home networking," in IEEE Transactions on Consumer Electronics, vol. 62, No. 1, pp. 39-44, Feb. 2016 (Year: 2016).*

International Search Report and Written Opinion from Corresponding International PCT Patent Application No. PCT/US19/59677, filed Nov. 4, 2019.

* cited by examiner

SECURE OVER-THE-AIR FIRMWARE UPGRADE

CROSS-REFERENCE TO RELATED APPLICATIONS

This application is a continuation of U.S. patent application Ser. No. 16/186,868, titled "SECURE OVER-THE-AIR FIRMWARE UPGRADE," filed Nov. 12, 2018, the entire contents of which are hereby incorporated by reference herein for all purposes.

BACKGROUND

1. Field

This specification relates to a system, a device and/or a method for secure over-the-air communication to upgrade the firmware of an embedded device.

2. Description of the Related Art

Embedded devices need firmware upgrades to enhance features, resolve issues and/or otherwise update the firmware. These embedded devices may be wireless embedded devices, which do not have a physical interface to receive a firmware upgrade, and thus, wireless embedded devices must receive a firmware upgrade via a wireless link or over-the-air. Moreover, these embedded devices also may not have continuous or constant connectivity with a service provider that provides the firmware upgrade, and thus, the embedded device may need to interact with and reach an agreement with a server of the service provider in a manner to coordinate the updates to the firmware.

When a firmware upgrade is sent over-the-air, the package is susceptible to security vulnerabilities. For example, a malicious party may gain access to the firmware upgrade by sniffing the over-the-air communication or impersonating the target device. In another example, an active attacker may create an altered version of the firmware upgrade and send the altered version of the firmware upgrade to the target device.

Accordingly, there is a need for a system, a method and/or a device that prevents unauthorized access to the firmware upgrade while also verifying and authenticating the integrity and the source of the firmware upgrade.

SUMMARY

In general, one aspect of the subject matter described in this specification is embodied in a device, a system and/or an apparatus for securely providing a firmware upgrade wirelessly or over-the-air. The system includes an embedded device configured to receive the firmware upgrade. The system includes a server having a memory configured to store a first key encryption key, the firmware upgrade and a firmware key and having a processor coupled to the memory. The processor is configured to obtain the firmware upgrade, the firmware key and the first key encryption key. The processor is configured to encrypt the firmware upgrade using the firmware key. The processor is configured to encrypt the firmware key with the first key encryption key and transmit the encrypted firmware upgrade and the encrypted firmware key to the embedded device.

These and other embodiments may optionally include one or more of the following features. The memory may be further configured to store a server private key. The processor may be further configured to digitally sign the encrypted firmware upgrade and the encrypted firmware key prior to transmitting the encrypted firmware upgrade and the encrypted firmware key to the embedded device.

The system may include a controller device. The controller device may have a memory that may be configured to store one or more key encryption keys or a server public certificate. The controller device may have a processor that may be configured to establish a connection with the server using the one or more key encryption keys. The processor may be configured to obtain the encrypted firmware upgrade and the encrypted firmware key and may verify the digital signature using the server public certificate. The processor may be configured to establish a connection with the embedded device using the one or more key encryption keys and may provide the encrypted firmware upgrade and the encrypted firmware key to the embedded device.

The processor of the server may be configured to receive a firmware delivery request. The firmware delivery request may include a mode of delivery of the firmware upgrade. Different modes of delivery may include a first mode that establishes a direct channel between the server and the embedded device, a second mode that establishes an indirect channel between the server and the embedded device via an offline controller and a third mode that establishes the indirect channel between the server and the embedded device via an online controller.

The first key encryption key may be a session key. The firmware key may be pre-encrypted using the session key when in the third mode or a general embedded device key that may be obfuscated within a previous firmware version when in the second mode.

The embedded device may have a memory. The memory may be configured to store firmware and the first key encryption key. The embedded device may have a processor that is coupled to the memory. The processor may be configured to store the encrypted firmware upgrade and the encrypted firmware key. The processor may be configured to decrypt the encrypted firmware key using the first key encryption key. The processor may be configured to decrypt the encrypted firmware upgrade using the firmware key. The processor may be configured to update the firmware using the firmware upgrade.

In another aspect, the subject matter is embodied in a system for secure delivery of a firmware upgrade. The system includes an embedded device that is configured to receive the firmware upgrade. The system includes a server having a memory configured to store a session key, a firmware upgrade and a firmware key. The system has a processor coupled to the memory. The processor is configured to encrypt the firmware upgrade using the firmware key and encrypt the firmware key with the session key. The processor is configured to send the encrypted firmware upgrade and the encrypted firmware key to the embedded device over a secure channel.

In another aspect, the subject matter is embodied in a method for secure delivery of firmware. The method includes encrypting a firmware upgrade with a firmware key. The method includes encrypting the firmware key using a session key. The method includes determining that an embedded device is in a first mode, a second mode or a third mode. The method includes transmitting the firmware upgrade and the encrypted firmware key to the embedded device when the embedded device is in the first mode and to a controller device when the embedded device is in the second mode or the third mode.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

Disclosed herein are systems, devices and methods for securing over-the-air delivery of firmware upgrades from a server or other computing device of a service provider to an embedded device. The embedded device may be a smart device or other embedded device, which may rely on over-the-air or wireless communication, to obtain firmware upgrades or other software upgrades. The embedded device may or may not have a physical interface to receive or obtain the firmware or other software upgrades, and thus, may require that the firmware upgrade be transmitted and received over-the-air.

The secure over-the-air upgrade system ("OTA upgrade system") has a server and an embedded device. The server, such as a computing device of a service provider, provides the embedded device, such as a smart wearable device, an Internet-of-Things (IoT) device, medical device or other embedded device, with a software package, such as a firmware upgrade, which may be used to update software on the embedded device. The OTA upgrade system may utilize a controller device ("controller") to interface between the server and the embedded device to provide offline capabilities and/or provide additional mobility and/or flexibility to deliver the software package to one or more embedded devices.

Other benefits and advantages include that the OTA upgrade system may establish a secure communication channel among the server, the embedded device and/or a controller. The secure communication channel utilizes encryption, authentication, signatures and/or other security mechanisms to protect the software package before, after and during transit. For example, the software package may be encrypted to protect the confidentiality of the software package during transit over-the-air. In another example, the software package may be signed to prevent modification of the software package during transit and to authenticate the source of the software package. Multiple encryption algorithms and/or keys may be used to protect both the software package and any necessary keys needed for distribution of the software package during transit. This allows the OTA upgrade system to provide a verified, authenticated and confidential software package over-the-air to the embedded device.

Figure 1:
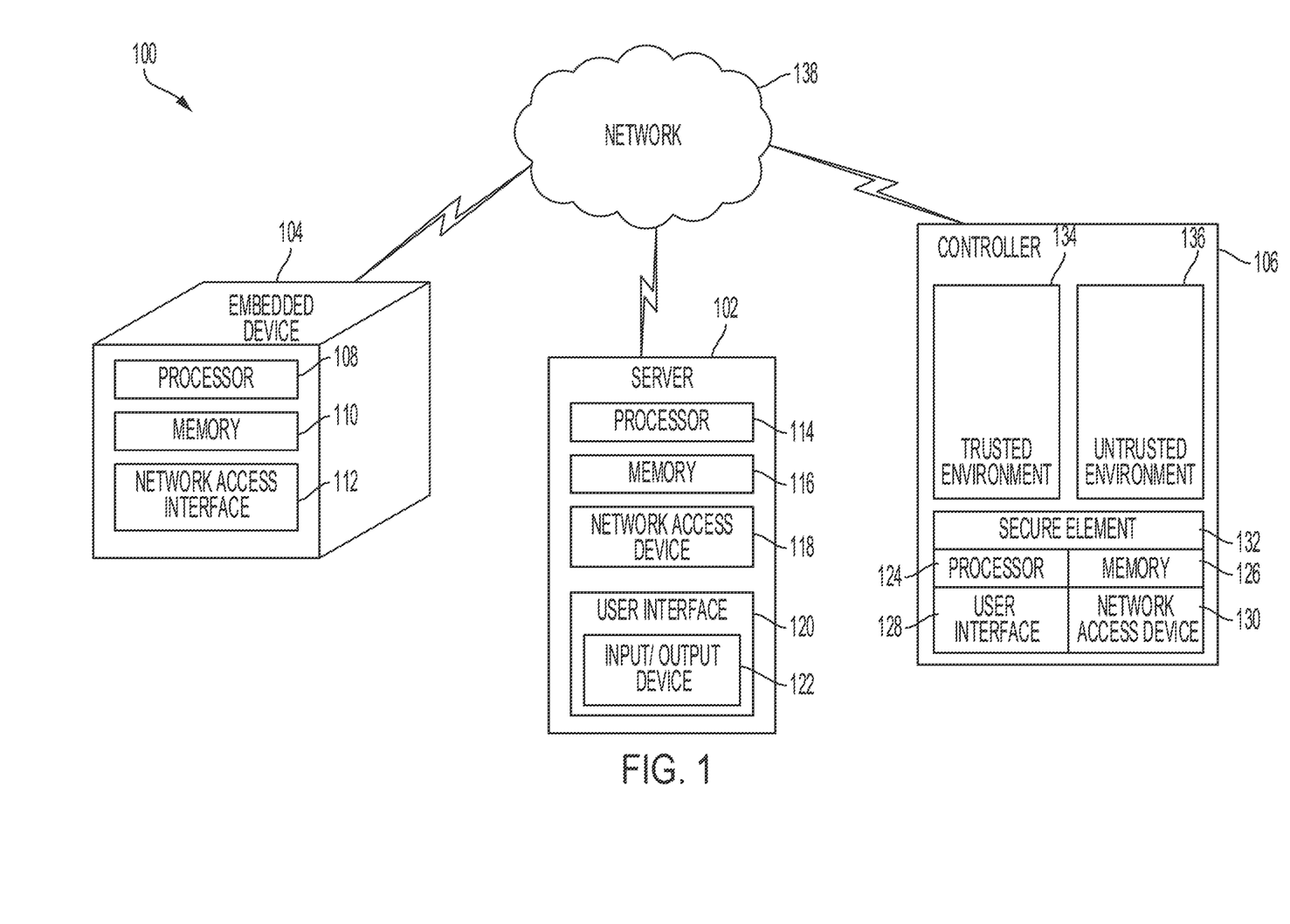
FIG. 1 shows an example block diagram of an over-the-air (OTA) upgrade system that upgrades the software, such as the firmware, of an embedded device according to an aspect of the invention.

FIG. 1 shows a block diagram of an OTA upgrade system 100 that upgrades the software, such as the firmware, of an embedded device 104, from a server 102. Hereinafter, even though a firmware upgrade that upgrades or updates the firmware on the embedded device may be referenced, the OTA upgrade system 100 may upgrade any type of software, such as an application, an operating system or other software including any low-level software on the embedded device 104 in a similar manner.

The OTA upgrade system 100 includes an embedded device 104 and a server 102. The OTA upgrade system 100 may include a controller device ("controller") 106 that is an intermediary between the embedded device 104 and the server 102. The embedded device 104 may be a smart device, which may or may not be wearable, a medical device, a portable device, such as a digital watch or audio player, router, smartphone, factory or industrial controller, or other special purpose computer or processor. In some implementations, the OTA upgrade system 100 may be connected to and provide a software upgrade to a general-purpose computer.

The embedded device 104 may include a processor 108 and a memory 110. The processor 108 may be a single processor or multiple processors. The processor 108 may receive data from one or more components and control the operations of the one or more components based on the received or determined data. For example, the processor 108 may decrypt the firmware upgrade from the server 102, verify and authenticate the firmware upgrade, and/or update the firmware of the embedded device 104 with the firmware upgrade.

The processor 108 may be coupled to the memory 110. The memory 110 may store instructions to execute on the processor 108 and may include one or more of a random-access memory (RAM) or other volatile or non-volatile memory. The memory 110 may be a non-transitory memory or a data storage device, such as a hard disk drive, a solid-state disk drive, a hybrid disk drive, or other appropriate data storage, and may further store machine-readable instructions, which may be loaded and executed by the processor 108. The memory 110 may store one or more keys used for encryption and/or decryption, such as a cloud-embedded device key, and/or one or more certificates, such as a server public certificate, used for signature verification.

Since the embedded device 104 may not have a physical interface, the embedded device 104 may have a network access interface 112. The network access interface 112 may include a communication port or channel, such as one or more of a Wi-Fi unit, a Bluetooth® unit, a radio frequency identification (RFID) tag or reader, or a cellular network unit for accessing a cellular network (such as 3G, 4G or 5G). The network access interface 112 may transmit data to and receive data from devices and systems not directly connected. The embedded device 104 may use the network access interface 112 to connect to the server 102 and/or controller 106 via the network 138, for example.

The network 138, such as a local area network (LAN), a wide area network (WAN), a cellular network, the Internet, or combination thereof, connects the embedded device 104 to the server 102 to receive over-the-air or wireless firmware updates. For example, the embedded device 104 may be coupled to the server 102 to access and download updates from a database within the server 102. In some implementations, the server 102 pushes updates to the embedded device 104.

The embedded device 104 may be coupled to the server 102. A server may be a computer in a network that is used to provide services, such as accessing files or sharing peripherals, to other computers in the network. The server 102 may be a service provider that provides the firmware upgrade to the embedded device 104. The server 102 includes a processor 114, a memory 116 and a network access device 118. The processor 114 may have similar components and/or functions but with more resources as the processor 108 of the embedded device 104. The processor 114 may use one or more keys, such as a cloud-to-embedded device key and/or a cloud-to-controller device key, and/or one or more certificates, such as a server private key, to encrypt, decrypt and/or sign packages and/or messages.

The processor 114 may be coupled the memory 116. The memory 116 may have similar components and/or functions but with more resources as the memory 110. The memory 116 may store one or more keys, such as a cloud-to-embedded device key and/or a cloud-to-controller device key, and/or one or more certificates, for example.

The memory 116 may store a database. A database is any collection of pieces of information that is organized for search and retrieval, such as by a computer, and the database may be organized in tables, schemas, queries, reports, or any other data structures. The database may use any number of database management systems. The information may include real-time information, periodically updated information, or user-inputted information. For example, the database may store multiple versions of various firmware upgrades for various embedded devices. The database may store one or more keys and/or one or more certificates used to encrypt/decrypt the various firmware upgrades and/or securely communicate with the various embedded devices.

The server 102 includes a network access device 118. The network access device 118 may have similar components and/or functions as the network access interface 112 of the embedded device 104 to access the network 138 to transmit and/or receive data among the server 102, the embedded device 104 and/or the controller 106.

The server 102 may include a user interface 120. The user interface 120 may include an input/output device 122 capable of receiving user input, such as a user interface element, a button, a dial, a microphone, a keyboard, or a touch screen, and any device capable of output, such as a display, a speaker, or a refreshable braille display. The user interface 120 may receive user input that includes the firmware upgrade, one or more keys and/or one or more certificates, for example. In another example, the user interface 120 may receive additional information to supplement the firmware upgrade, such as version number, and/or additional information to supplement the one or more certificates, such as one or more immutable identifiers.

The OTA upgrade system 100 may include a controller 106. The controller 106 may provide either an online or an offline interface between the embedded device 104 and the server 102. When the controller 106 provides an online interface, the server 102 and the embedded device 104 establish a connection through the controller 106 using the network 138 and all three devices are simultaneously connected. The server 102 provides the firmware upgrade to the embedded device 104 via the controller 106 through the established connection. When the controller 106 provides an offline interface between the embedded device 104 and the server 102, the server 102 connects to the controller 106 separately and distinctly from when the controller 106 connects to the embedded device 104. The server 102 provides the firmware upgrade to the controller 106, which is not connected to the embedded device 104 during the transfer. Then, the controller 106 subsequently establishes a connection and provides the firmware upgrade to the embedded device 104.

The controller 106 has a processor 124 and a memory 126. The processor 124 may have similar components and/or functions as the processors 108, 114. The memory 126 may have similar components and/or functions as the memory 110, 116. In some implementations, the memory 126 may be an encrypted memory. The controller 106 may have a user interface 128 and/or a network access device 130. The user interface 128 and/or the network access device 130 have similar components and/or functions as the user interface 120 and/or the network access device 118 or network access interface 112, respectively.

The controller 106 may have a trusted execution environment ("trusted environment") 134 and/or an untrusted execution environment ("untrusted environment") 136. The components within the trusted environment 134 are logically and/or physically isolated and/or sandboxed from other components within the untrusted environment 136. The trusted environment 134 may run a separate and/or a distinct operating system and have distinct resources from the untrusted environment 136. The trusted environment 134 and the untrusted environment 136 may have different processors, for example.

The controller 106 may include a secure element 132. The secure element 132 may provide key generation, key storage and/or other cryptographic functions. In some implementations, the secure element 132 is included in, embedded within or inserted into the controller 106. The secure element 132 may be a separate hardware token or device or a secure element chip, such as an integrated circuit and/or memory, which securely stores certificates, keys or other authentication or identification information data. The controller 106 may utilize the secure element 132 and/or the trusted environment 134 to perform secure functions, such as pairing or establishing a secure connection with the server 102 and/or the embedded device 104 and/or storing the firmware upgrade when the controller 106 is offline.

Any, all or parts of the components of the controller 106, such as the processor 124, the memory 126, the user interface 128 or the network access device 130, may be within the trusted execution environment 134, the secure element 132 and/or the untrusted execution environment 136.

Figure 2:
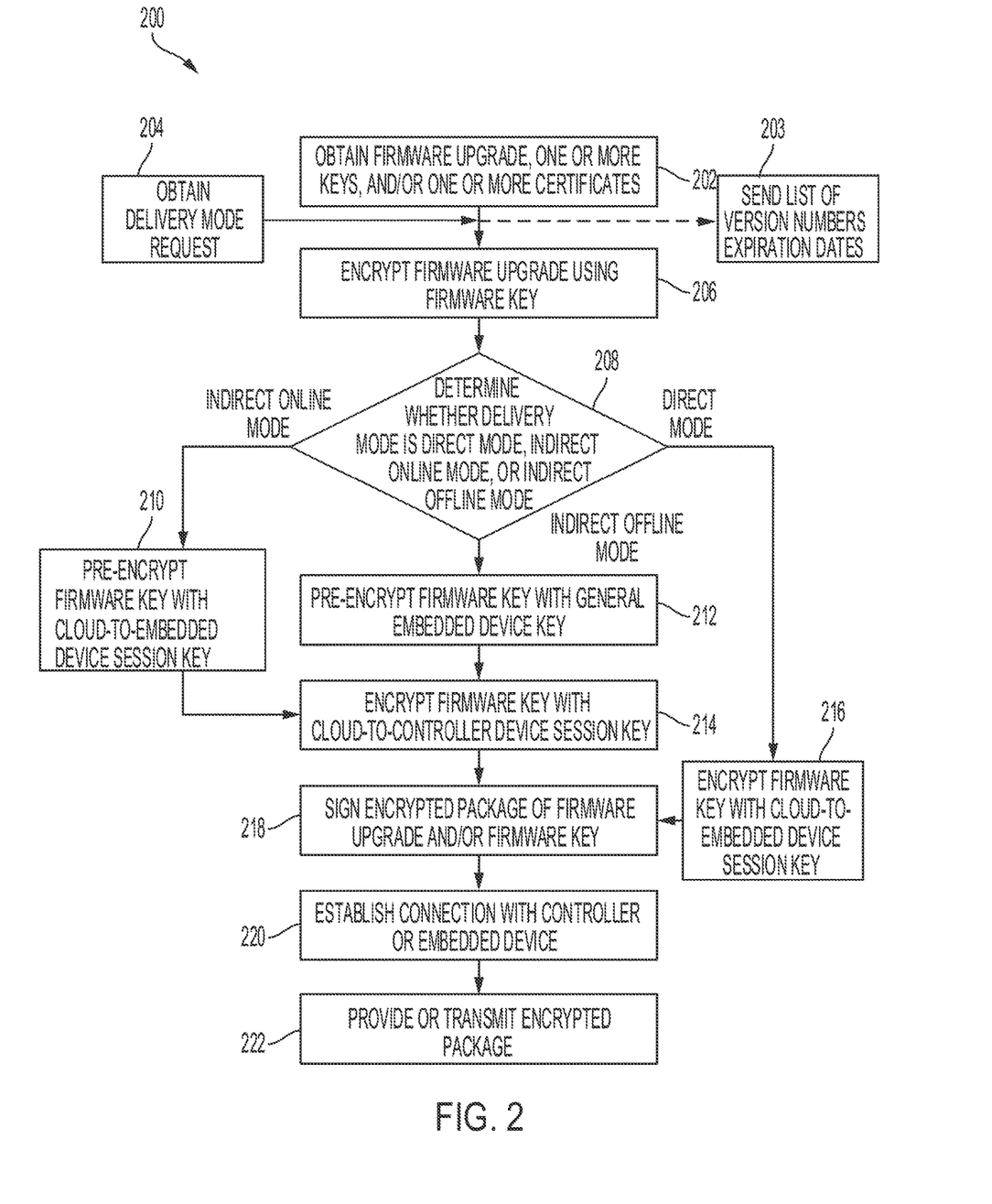
FIG. 2 is a flow diagram of an example process implemented on the server of the OTA upgrade system of FIG. 1 to securely provide the firmware upgrade to the embedded device according to an aspect of the invention.

FIG. 2 is a flow diagram of a process 200 implemented on the server 102 to securely provide the firmware upgrade to the embedded device 104. The one or more computers or data processing apparatuses, for example, the processor 114 of the server 102 of the OTA upgrade system 100 of FIG. 1, appropriately programmed, may provide, transmit or otherwise send the firmware upgrade to the embedded device 104.

The server 102 may obtain one of more firmware upgrades, one or more keys, one or more immutable identifiers and/or one or more certificates (202). The server 102 may obtain one or more firmware upgrades, one or more keys, one or more immutable identifiers and/or one or more certificates from a user. An administrator of the OTA upgrade system 100 may provide the one or more firmware upgrades, the one or more keys, the one or more immutable identifiers and/or the one or more certificates to the server 102 via the user interface 120. The server 102 stores the one or more firmware upgrades, the one or more keys, the one or more immutable identifiers and/or the one or more certificates in the memory 116 to subsequently provide or to be delivered to the controller 106 or the embedded device 104.

The one or more firmware upgrades may have a version number and/or an embedded device association. The version number may be a version control number that provides information, such as the date that the service provider released the firmware upgrade and/or the changes associated with the version of the firmware upgrade. The embedded device association may be a unique identifier for each type or category of embedded device that the firmware upgrade updates.

The one or more keys may include one or more firmware keys and/or one or more key encryption keys (KEKs). The one or more keys may have been randomly generated. The server 102 may use the one or more firmware keys to encrypt/decrypt the firmware upgrade before, after and/or during delivery of the firmware upgrade to the embedded device 104. The server may use the one or more KEKs to encrypt/decrypt the one or more firmware keys, before, after and/or during delivery of the one or more firmware keys to the embedded device 104.

The one or more certificates may include one or more device certificates. The one or more device certificates may include a private key certificate, such as a server private key, and/or a public device certificate, such as a server public key. The server 102 may use the private certificate to digitally sign the firmware upgrade and/or the firmware key prior to delivery to the embedded device 104. The embedded device 104 may use the public certificate to verify the digital signature. The use of the private/public certificate ensures that the signed contents have not been modified during transit, i.e., the digital signature protects the integrity of the signed contents and/or identifies the source of the signed contents. Moreover, the one or more certificates may have one or more immutable identifiers that are bounded to the certificate. This provides additional authentication of the source for the signed contents.

The one or more immutable identifiers may include an International Mobile Equipment Identity (IMEI) number, a phone number, a Bluetooth Low Energy (BLE) Media Access Control (MAC) address, a TrustZone Identifier (ID) or other device identifiers that may be bound and associated with a device certificate. The one or more immutable identifiers may be specific identifiers of the embedded device 104 that are immutable and/or unchangeable.

The server 102 may sign and transmit to the controller 106 or to the embedded device 104 a list of firmware version numbers and associated expiry dates (203). The list of firmware version numbers and associated expiry dates may be used to identify when a firmware version expires and/or when a firmware upgrade is necessary.

The server 102 may obtain a delivery mode request or obtain the mode of delivery from within the firmware upgrade (204). The delivery mode request is a request from the embedded device 104 to deliver the firmware upgrade in using a specific mode. The delivery mode request may include the specific implementation and manner of delivery of the firmware upgrade. In some implementations, the firmware upgrade specifies the implementation and manner of delivery and the server 102 extracts the mode of delivery from the firmware upgrade.

The delivery mode request may identify one or more modes of delivery. The one more modes may include a direct cloud-to-embedded device mode ("direct mode"), an indirect offline cloud-to-controller-to-embedded device mode ("indirect offline mode") and/or an indirect online cloud-to-controller-to-embedded device mode ("indirect online mode"). In the direct mode, the server 102 establishes a direct channel between the server 102 and the embedded device 104. In the indirect offline mode, the server 102 establishes an indirect channel between the server 102 and the embedded device 104 via an offline controller 106. In the indirect online mode, the server 102 establishes the indirect channel between the server 102 and the embedded device 104 via an online controller 106.

The server 102 may obtain the delivery mode request from the embedded device 104 after the server 102 and the embedded device 104 are paired and/or have established a secure communication channel between the server 102 and the embedded device 104. In some implementations, the server 102 may initialize and default to the direct mode until after a first firmware upgrade has been successfully delivered to the embedded device 104. For example, the embedded device 104 may be pre-configured to require that the first firmware upgrade be delivered via the direct mode.

The server 102 may encrypt the firmware upgrade (206). The server 102 may encrypt the firmware upgrade using a firmware key. The firmware key may be a unique key for each firmware upgrade or each version of the firmware for each embedded device 104. Thus, the embedded device 104 may not have the firmware key prior to obtaining the firmware key from the server 102, and so if the firmware upgrade is sent to an unintended other embedded device, the unintended other embedded device will be unable to decrypt the firmware upgrade. That is, even if another device has access to the encrypted firmware upgrade, the other device will be unable to decrypt the firmware upgrade and access the firmware upgrade.

The server 102 may determine whether the delivery mode is the direct mode, indirect online mode or indirect offline mode for delivery of the firmware upgrade (208). The direct mode and the indirect online mode are online delivery modes. Online delivery modes require that the server 102 maintain continuous connectivity between the server 102 and the embedded device 104 either directly or indirectly via the controller 106 before, after and/or during the delivery of the firmware upgrade. Whereas, the indirect offline delivery mode is an offline delivery mode that allows the server 102 to store the firmware upgrade on the controller 106 to subsequently be delivered to the embedded device 104.

The server 102 may determine the delivery mode based on specific implementation and manner of delivery of the firmware upgrade, e.g., the one or more modes of delivery specified in the delivery mode request or specified in the firmware upgrade. The server 102 may extract the one or more modes of delivery from the delivery mode request and determine the delivery mode. The mode included within the delivery mode request may be represented as a flag, bit or other indicator that indicates the mode of delivery.

If the server 102 determines that the mode is the indirect online mode, the server 102 may pre-encrypt the firmware key using a first key encryption key (210). The first key encryption key may be a cloud-to-embedded device session key. By encrypting the firmware key with the cloud-to-embedded device session key, the server 102 prevents the controller 106 from gaining access to the firmware key, which protects the confidentiality of the firmware upgrade, because the controller does not have access to the cloud-to-embedded device session key. Moreover, since the cloud-to-embedded device session key may be a unique key that is specific to each embedded device and/or each type of embedded device, the server 102 may prevent access to the firmware key from another unintended embedded device or an unintended type of embedded device because these other embedded devices do not have the specific cloud-to-embedded device session key.

If the server 102 determines that the mode is the indirect offline mode, the server 102 may pre-encrypt the firmware key using a second key encryption key (212). The second key encryption key may be a general embedded device key. The general embedded device key may be obfuscated within the firmware code of the previous firmware version. The original or initial firmware version may have the firmware code included during manufacturing and/or provisioning. For example, if the firmware upgrade that is associated with the firmware key is version 2.0, then the previous version of the firmware, e.g., version 1.0, may have included the general embedded device key associated with the current firmware upgrade version 2.0. The current version of the firmware upgrade that is being delivered may include the general embedded device key for the next firmware upgrade. For example, the firmware upgrade version 2.0 may contain the general embedded device key for firmware upgrade version 3.0.

By encrypting the firmware key with the general embedded device key, the server 102 prevents the controller 106 from gaining access to the firmware key, which protects the confidentiality of the firmware upgrade, because the controller 106 does not have access to the general embedded device key. The general embedded device key may, however, be obfuscated within the firmware code of all embedded devices that utilize the previous firmware version and may not be unique to each embedded device. However, since the controller 106 does not have access to the firmware key, the firmware upgrade may be stored on the controller 106 and transported along with the controller 106 until the embedded device 104 requests the firmware upgrade.

In some implementations, the firmware key is pre-encrypted using the cloud-to-device session key or the general embedded device key for the indirect online mode or the indirect offline mode, respectively, by another entity than the server 102 and were merely obtained and stored within the server 102.

When the server 102 determines that the mode is either the indirect online mode or the indirect offline mode, the server 102 encrypts the pre-encrypted firmware key with a third key encryption key, such as a cloud-to-controller device session key (214). This protects firmware key in transit to the controller 106 to be subsequently distributed one or more embedded devices. In some implementations, the server 102 may also encrypt the encrypted firmware upgrade with the third key encryption key for additional security.

If the server 102 determines that the mode is the direct mode, there is no need for the server 102 to pre-encrypt the firmware key because the server 102 delivers or provides the firmware upgrade directly to the embedded device 104 without traversing through the controller 106 or any other device. Instead, the server 102 encrypts the firmware key with a fourth key encryption key, such as a cloud-to-embedded device session key (216). The cloud-to-embedded device session key may only be known to the server 102 and the embedded device 104 and may have been pre-shared. By encrypting the firmware key with the cloud-to-embedded device key no other device may access the firmware key, and thus, the firmware upgrade. In some implementations, the server 102 may also encrypt the encrypted firmware upgrade with the fourth key encryption key.

The server 102 may sign the firmware upgrade and/or the firmware key prior to transmitting, sending or otherwise providing the firmware upgrade and/or the firmware key (218). The server 102 may combine the firmware upgrade and/or the firmware key, which may have been previously encrypted, into a single data package. In some implementations, the server 102 keeps the delivery of the firmware upgrade and the firmware key as separate package deliveries to make intercept more difficult. The server 102 may obtain the server private key from the memory 116 and use to the server private key to digitally sign the firmware upgrade and/or the firmware key. The server 102 may digitally sign the cryptographic hash function output of the concatenation of one or more of the firmware upgrade, the firmware upgrade key, the firmware upgrade version number and/or the embedded device identifier. When the server 102 signs the firmware upgrade and/or the firmware key, the server 102 may include the server public key when the server 102 transmits the firmware upgrade and/or the firmware key. By digitally signing the firmware upgrade and/or the firmware key, the digital signature may be verified to ensure that the firmware upgrade and/or the firmware key have not been modified and that the source of the firmware upgrade and/or the firmware key is the server 102.

After the server 102 encrypts the firmware key and/or the firmware upgrade, the server 102 establishes a connection with the controller 106 or the embedded device 104 (220). The server 102 establishes the connection with the controller 106 or the embedded device 104 based on the mode of delivery. If the mode is in the indirect offline mode or the indirect online mode, the server 102 establishes the connection with the controller 106. The server 102 may use the cloud-to-controller device session key to establish a secure connection with the controller 106. If the mode is in the direct mode, the server 102 establishes the connection with the embedded device 104. The server 102 may use the cloud-to-embedded device session key to establish the secure connection with the embedded device 104.

Once the server 102 has established the connection with the controller 106 or the embedded device 104 and has encrypted the firmware key and the firmware upgrade, the server 102 sends, provides and/or transmits the encrypted firmware key and the encrypted firmware upgrade to the controller 106 or the embedded device 104 (222). If the mode is the indirect offline or the indirect online mode, the server 102 sends, transmits or otherwise provides the encrypted firmware key and the encrypted firmware upgrade to the controller 106. And, if the mode is the direct mode, the server 102 sends, transmits or otherwise provides the encrypted firmware key and the encrypted firmware upgrade to the embedded device 104.

Figure 3:
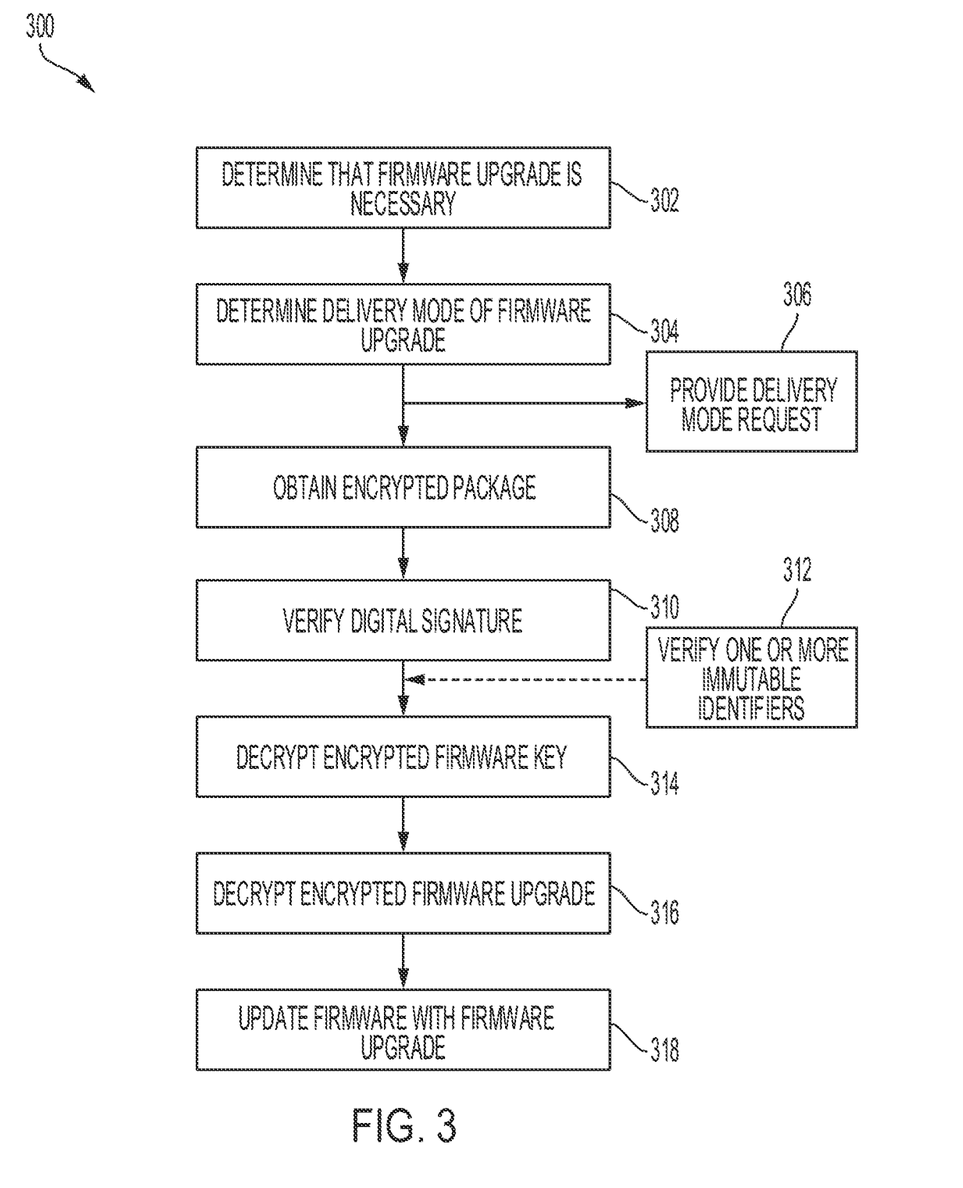
FIG. 3 is a flow diagram of an example process implemented on the embedded device of the OTA upgrade system of FIG. 1 to securely obtain and deliver the firmware upgrade according to an aspect of the invention.

FIG. 3 is a flow diagram of a process 300 implemented on the embedded device 104 to securely obtain and decrypt the firmware upgrade. The one or more computers or data processing apparatuses, for example, the processor 108 of the embedded device 104 of the OTA upgrade system 100 of FIG. 1, appropriately programmed, may obtain and decrypt the firmware upgrade.

The embedded device 104 may determine that a firmware upgrade is necessary (302). The embedded device 104 may obtain or had previously obtained the list of firmware version numbers and associated expiration dates from the controller 106 and/or the server 102, verify any signature on the list of firmware version numbers and check the firmware version to see if the version has expired. In some implementations, each firmware version may include expiration information that indicates that the version has expired. The embedded device 104 may determine that the firmware is outdated if a current date is older than a firmware expiration date, which indicates that a new firmware upgrade is necessary.

In some implementations, the embedded device 104 sends the firmware version to the server 102. And, in response, the embedded device 104 may receive an indication from the server 102 that indicates that the firmware version is outdated or has expired and/or a new firmware upgrade is available for the embedded device 104. If the firmware version is outdated or has expired, the embedded device may cease normal operation and may enter a safe-mode that requires a firmware upgrade.

The embedded device 104 may determine that a firmware upgrade is necessary upon activation. The embedded device 104 may request and obtain a timestamp of the current date and/or time, compare the timestamp to the expiration date of the firmware and determine that the firmware upgrade is necessary if the current date and/or time exceeds the expiration date. For example, the embedded device may receive a signed timestamp from the controller 106 or the server 102, check the validity of the signature and/or check that the current firmware version has not expired using the timestamp and the expiration dates and/or times for the certificates and/or firmware version. The signature may include other identifiers, such as the embedded device's ID, the controller's ID and a random nonce that is sent by the embedded device to the controller, which may be verified or validated. The signature may be a signature using either the controller's private key or the server's private key.

In some implementations, the embedded device 104 upon a first-use may not start normal operation and may require a firmware upgrade until the embedded device obtains the list of firmware version numbers and their expiry dates, e.g., from the controller 106, along with a digital signature of the server 102. The embedded device 104 may require on the first-use that embedded device's firmware version be included within the list of firmware version numbers and that the embedded device's firmware version is not expired along with verification of the digital signature using the server's public key and/or controller's public key.

The embedded device 104 may determine the mode of delivery of the firmware upgrade and/or the firmware key (304). The embedded device 104 may initially be set, e.g., at the factory, in the direct mode, which establishes and requires a direct connection to the server 102 to download the initial firmware upgrade and/or the firmware key over-the-air or wirelessly. The embedded device 104 may receive an indication to change to a different mode, such as the indirect offline mode and/or the indirect online mode, for the next firmware upgrade.

The embedded device 104 establishes a connection with the server 102 using the cloud-to-embedded device session key or the controller 106 using the controller-to-embedded device session key when in the direct mode or the indirect online/offline mode, respectively. The embedded device 104 sends or otherwise provides a delivery mode request that includes the mode of delivery to the server 102 directly or indirectly via the controller 106 through the established connection (306).

After the embedded device 104 determines that a firmware upgrade is necessary, the embedded device 104 may obtain the encrypted firmware upgrade and/or the encrypted firmware key (308). The embedded device 104 may obtain the encrypted firmware upgrade and/or the encrypted firmware key based on the mode of delivery. If the embedded device 104 is set in the direct mode, the embedded device 104 obtains the encrypted firmware upgrade and/or the encrypted firmware key directly from the server 102. If the embedded device 104 is set in the indirect offline or indirect online mode, the embedded device 104 obtains the encrypted firmware upgrade and/or the encrypted firmware key from the controller 106.

In some implementations, the embedded device 104 may also receive the server public key and/or the public key certificate. In some implementations, the server public key and/or public key certificate is pre-stored or already stored within the embedded device 104. For example, the server public key and/or public key certificate may be pre-installed within the embedded device 104 during manufacturing, provisioning and/or distribution of the embedded device 104.

The embedded device 104 may verify the digital signature that the server 102 had used to digitally sign the encrypted firmware upgrade and/or the encrypted firmware key (310). The embedded device 104 may use the server public key to verify the digital signature. By verifying the digital signature, the embedded device 104 verifies that no modifications were made to the firmware upgrade and/or firmware key. Moreover, the embedded device 104 verifies that the firmware upgrade and/or the firmware key arrived from the server 102. That is, the digital signature authenticates the source and the integrity of the firmware upgrade and/or the firmware key.

The embedded device 104 may verify one or more immutable identifiers (312). The one or more immutable identifiers may be included within the public key certificate associated with the digital signature. For example, the embedded device 104 may verify that a unique identifier associated with the embedded device 104, such as an International Mobile Equipment Identity (IMEI) number, a phone number, a Bluetooth Low Energy (BLE) Media Access Control (MAC) address, a TrustZone Identifier (ID) or another identifier of the embedded device 104. The embedded device 104 may send the one or more immutable identifiers to the server 102 to compare to a database of information, for example.

The embedded device 104 decrypts the encrypted firmware key using the fourth key encryption key or a fifth key encryption key based on the mode of delivery (314). If the embedded device 104 is in the indirect offline mode or the indirect online mode, the embedded device 104 may decrypt the encrypted firmware key using the fifth key encryption key, such as a controller-to-embedded device session key. If the embedded device 104 is in the direct mode, the embedded device 104 may decrypt the encrypted firmware key using the fourth key encryption key, such as the cloud-to-embedded device session key.

When the embedded device 104 is in the indirect online mode or the indirect offline mode, the embedded device 104 may further decrypt firmware key, as the firmware key may have been pre-encrypted using the first key encryption key, such as the cloud-to-embedded device session key, or the second key encryption key, such as the general embedded device key, which was obfuscated within the firmware. The embedded device 104 further decrypts the firmware key using the first or second key encryption key when the embedded device is in the indirect online mode or the indirect offline mode, respectively.

Once the firmware key is decrypted, the embedded device 104 uses the firmware key to decrypt the encrypted firmware upgrade (316). In some implementations, if the encrypted firmware upgrade was further encrypted with the fifth or fourth key encryption key, the embedded device 104 may further decrypt the encrypted firmware upgrade with the fifth key encryption or the fourth key encryption key prior to decrypting the firmware upgrade using the firmware key. The embedded device 104 updates the current version of the firmware with the firmware upgrade (318). For example, the embedded device 104 may overwrite the current firmware with the firmware upgrade.

Figure 4:
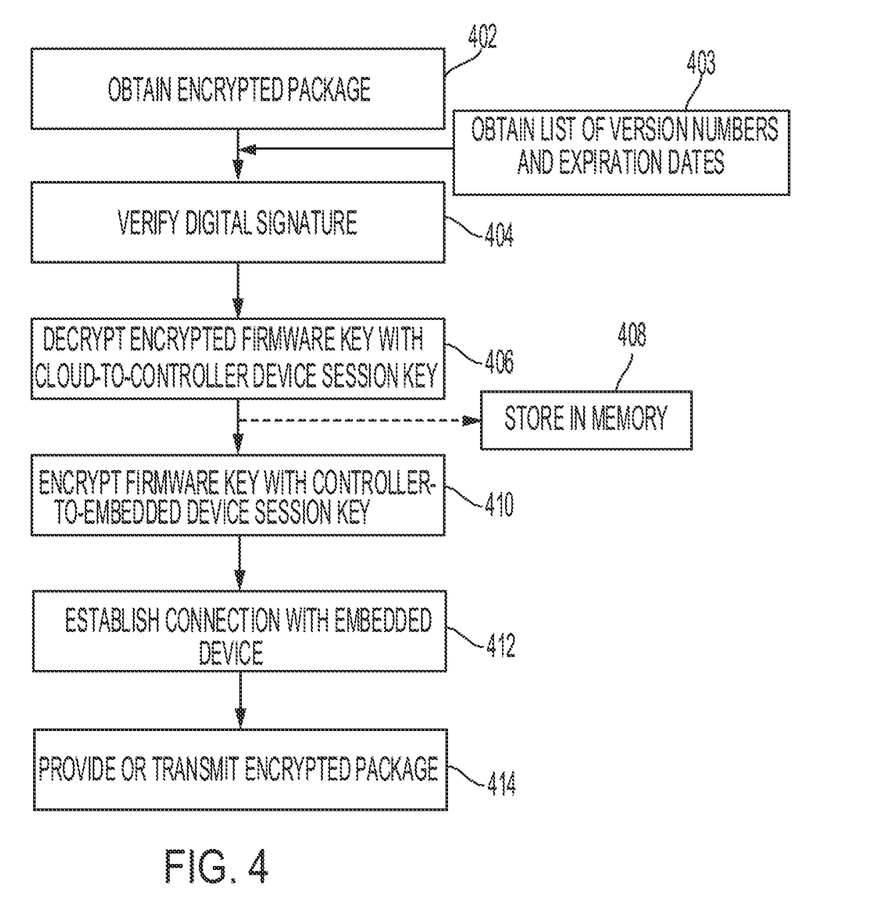
FIG. 4 is a flow diagram of an example process implemented on the controller of the OTA upgrade system of FIG. 1 to securely obtain and decrypt the firmware upgrade according to an aspect of the invention.

FIG. 4 is a flow diagram of a process 400 implemented on the controller 106 to securely obtain and decrypt the firmware upgrade. The one or more computers or data processing apparatuses, for example, the processor 124 of the controller 106 of the OTA upgrade system 100 of FIG. 1, appropriately programmed, may obtain and decrypt the firmware upgrade.

The controller 106 obtains the encrypted firmware upgrade and the encrypted firmware key (402). The controller 106 receives the encrypted firmware upgrade and the encrypted firmware key when the embedded device 104 is set in the indirect online mode or the indirect offline mode. The controller 106 may have received the encrypted firmware upgrade over an established connection using the cloud-to-controller device session key.

The controller 106 may obtain a list of firmware version numbers and associated expiration dates from the server 102 (403). The controller 106 may store the list of firmware version numbers and associated expiration dates to subsequently provide to the embedded device 104. In some implementations, the list of firmware version numbers and associated expirations dates may have been signed by the server 102 and/or the controller 106 may digitally sign the list of firmware version numbers and associated expiration dates.

The controller 106 may have stored and/or have obtained the server public key and use the server public key to verify the digital signature (404). The one or more keys may have been stored in the secure element 132, for example. Subsequently, if the embedded device 104 is set in the indirect offline mode or the indirect online mode, the controller 106 decrypts the encrypted firmware key using the third key encryption key, such as the cloud-to-controller device session key (406). The controller 106 may also decrypt, using the third key encryption key, the firmware upgrade if the firmware upgrade was encrypted with third key encryption key.

Since the firmware key is still pre-encrypted, the controller 106 does not have access to the firmware key, and without the firmware key, the controller 106 is unable to access the firmware upgrade.

Once the firmware key is decrypted using the third key encryption key, the controller 106 may store the encrypted firmware upgrade and the pre-encrypted firmware key within the memory 126 and/or the secure element 132 (408). Thus, the controller 106 does not need to be simultaneously connected to the embedded device 104 to transmit the encrypted firmware upgrade and/or the pre-encrypted firmware key to the embedded device 104, such as when the embedded device 104 is in the indirect offline mode, for example.

When the controller 106 is ready to transmit or provide the firmware upgrade and/or firmware key to the embedded device 104, the controller 106 re-encrypts the pre-encrypted firmware key using the fifth key encryption key, such as the controller-to-embedded device key (410). The controller may additionally encrypt the encrypted firmware upgrade with the fifth key encryption key for additional security, but this is generally not necessary.

The controller 106 establishes a connection using the controller-to-embedded device session key (412). The controller 106 may establish the connection using the controller-to-embedded device session. Once the pre-encrypted firmware key is re-encrypted, the controller 106 sends, transmits or otherwise provides the encrypted firmware upgrade and the encrypted firmware key to the embedded device 104 (414). The controller 106 may send the firmware upgrade and the firmware key when the embedded device 104 becomes available on the network 138. The controller 106 may provide or deliver the list of the firmware version numbers and associated expiration dates to the embedded device 104, while the connection is established.

Figure 5A:
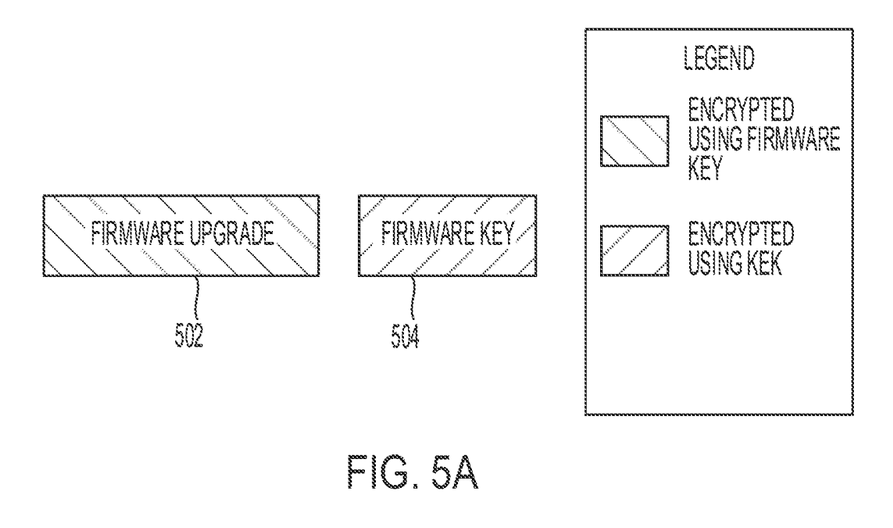
FIG. 5A shows an example encrypted firmware upgrade and/or firmware key when the OTA system of FIG. 1 is in the direct mode according to an aspect of the invention.
Figure 5B:
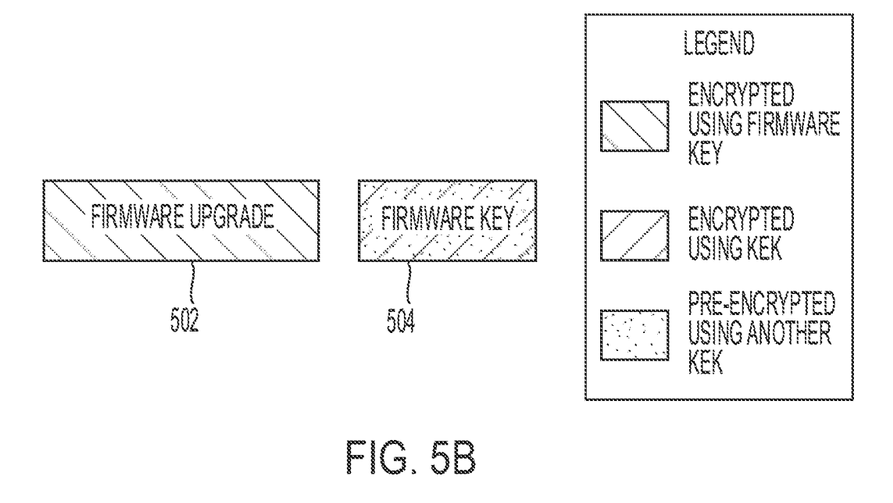
FIG. 5B shows an example encrypted firmware upgrade and/or firmware key when the OTA system of FIG. 1 is in the indirect offline mode or the indirect online mode according to an aspect of the invention.

FIGS. 5A-5B show the encrypted firmware upgrade and/or encrypted firmware key when the OTA system of FIG. 1 is in the different modes. FIG. 5A shows the firmware upgrade 502 encrypted using the firmware key 504 when the OTA system 100 is in the direct mode. Moreover, the firmware key 504 is encrypted using a key encryption key, such as a cloud-to-embedded device session key in the direct mode.

FIG. 5B, on the other hand, shows the firmware upgrade 502 encrypted using the firmware key 504 and a pre-encrypted firmware key 504. The firmware key 504 may be pre-encrypted using the generally embedded device key or the cloud-to-embedded device key when the OTA system 100 is in the indirect offline mode or the indirect online mode, respectively. Then, the firmware key 504 is further encrypted using another key encryption key, such as the cloud-to-controller device session key or the controller-to-embedded device session key.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for secure over-the-air delivery of a firmware upgrade to an embedded device, comprising:
    a server having:
        a memory programmed to store the firmware upgrade, a firmware key, and a key encryption key; and
        a processor coupled to the memory and programmed to:

receive or determine a delivery mode associated with the firmware upgrade, obtain the firmware upgrade, the firmware key, and the key encryption key, encrypt, using the firmware key, the firmware upgrade, encrypt, using the key encryption key, the firmware key, establish a connection with a controller between the server and the embedded device, and transmit the encrypted firmware upgrade and the encrypted firmware key to the controller when the embedded device is not in communication with or not connected to the processor, the encrypted firmware upgrade and the encrypted firmware key being subsequently delivered or transmitted to the embedded device when the embedded device becomes available to receive the encrypted firmware upgrade.

2. The system of claim 1, wherein the delivery mode is an indirect offline delivery mode that enables the server to transmit, to the controller, the encrypted firmware upgrade (i) to be stored on the controller at a first time when the embedded device is not available to receive the encrypted firmware upgrade and (ii) to subsequently be delivered to the embedded device at a second time later than the first time when the embedded device becomes available to receive the encrypted firmware upgrade.

3. The system of claim 1, wherein the key encryption key is a general embedded device key that is obfuscated within a previous version of firmware related to the firmware upgrade.

4. The system of claim 1, wherein the firmware upgrade includes a general embedded device key to be utilized for a subsequent firmware upgrade.

5. The system of claim 1, wherein the firmware upgrade is programmed to be stored on the controller until the embedded device requests for the firmware upgrade.

6. The system of claim 1, wherein:
the firmware key is a pre-encrypted firmware key encrypted via an apparatus different from the server and using a general embedded device key; and
the obtaining of the firmware key includes receiving, from the apparatus different from the server, the pre-encrypted firmware key.

7. The system of claim 1, wherein the key encryption key is a session key between the server and the controller.

8. A system for secure over-the-air delivery of a firmware upgrade to an embedded device, comprising:
a server having:
a memory programmed to store the firmware upgrade, a firmware key, and a key encryption key; and
a processor coupled to the memory and programmed to:
receive or determine a delivery mode associated with the firmware upgrade,
obtain the firmware upgrade, the firmware key, and the key encryption key,
pre-encrypt, using the firmware key, the firmware upgrade,
pre-encrypt, using the key encryption key, the firmware key,
encrypt, using a first session key, the pre-encrypted firmware upgrade and the pre-encrypted firmware key, the controller being between the server and the embedded device,
establish a connection with the controller, and
transmit the encrypted firmware upgrade and the encrypted firmware key to the controller when the server, the controller, and the embedded device are simultaneously online for the transmission, the encrypted firmware upgrade and the encrypted firmware key being subsequently delivered or transmitted to the embedded device.

9. The system of claim 8, wherein the key encryption key is a second session key between the server and the embedded device.

10. The system of claim 9, wherein the second session key is a unique key specific to the embedded device or a device type associated with the embedded device.

11. The system of claim 8, wherein the processor is further programmed to verify one or more immutable identifiers associated with the embedded device and digitally sign, prior to the transmission and based on a digital certificate related to the one or more immutable identifiers, at least one of the encrypted firmware upgrade or the encrypted firmware key.

12. The system of claim 8, wherein the processor is further programmed to transmit, to the embedded device, a list of firmware version numbers and associated expiration dates to enable the embedded device to determine whether to request for the firmware upgrade.

* * * * *